United States Patent Office 3,006,123
Patented Oct. 31, 1961

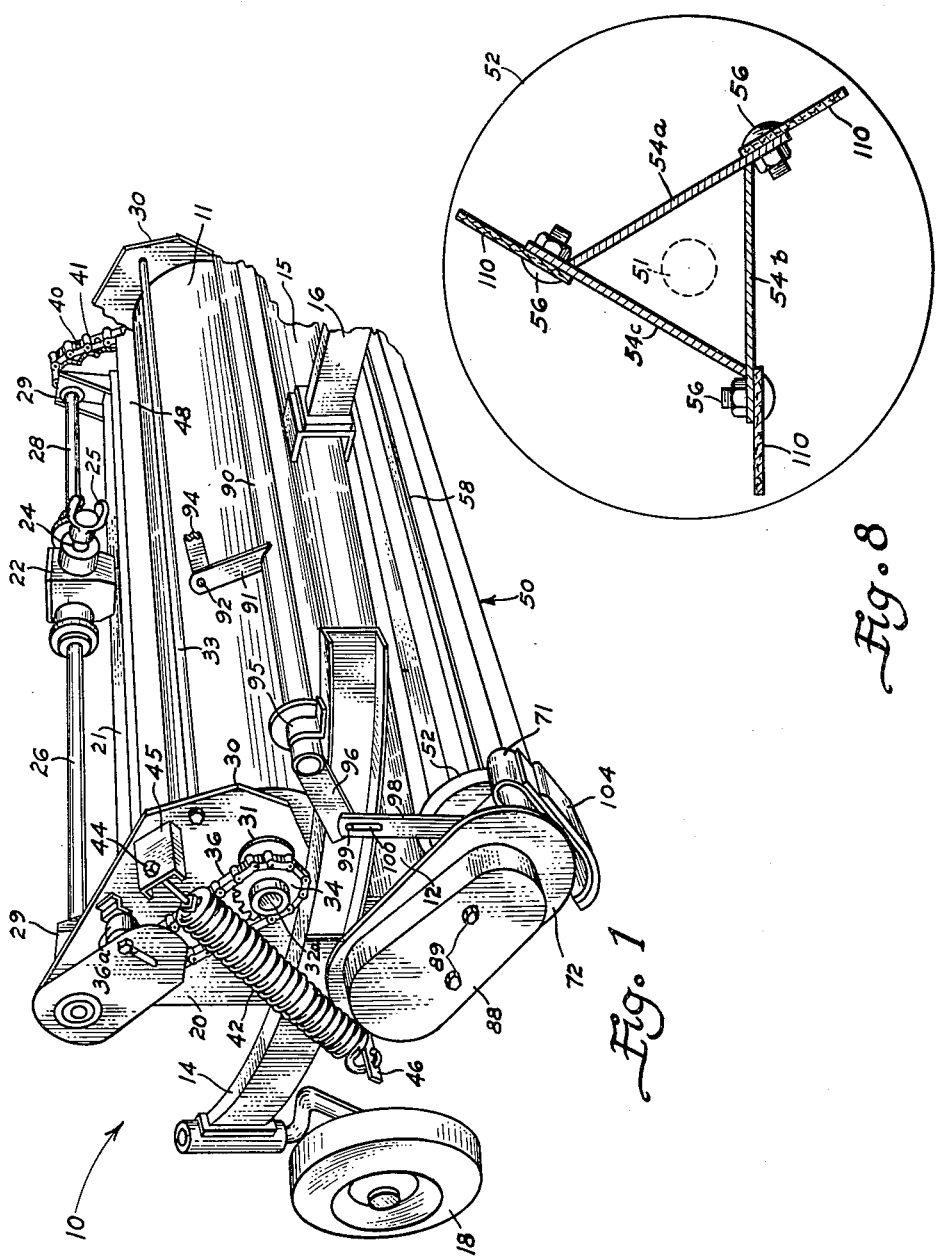

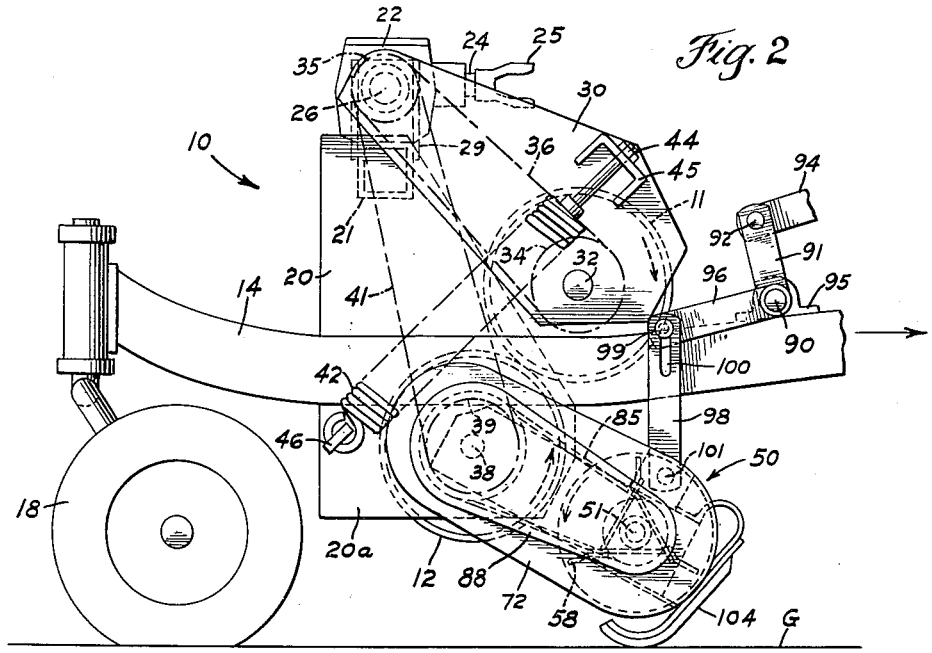
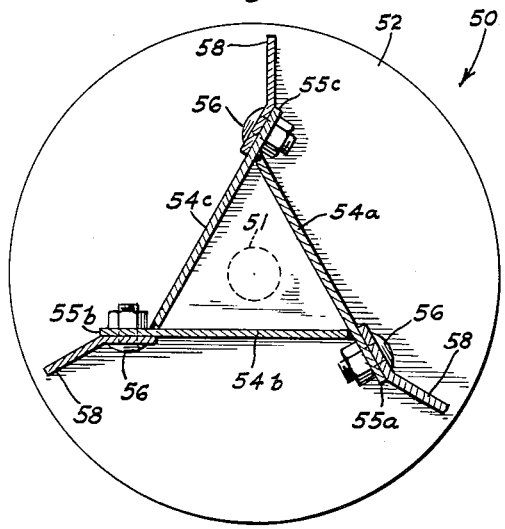
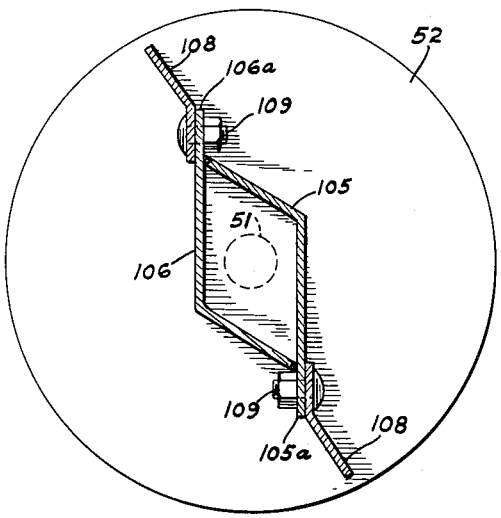
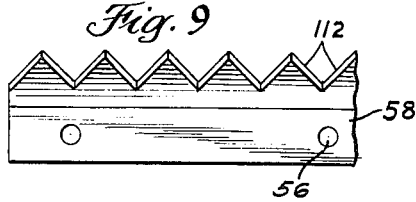

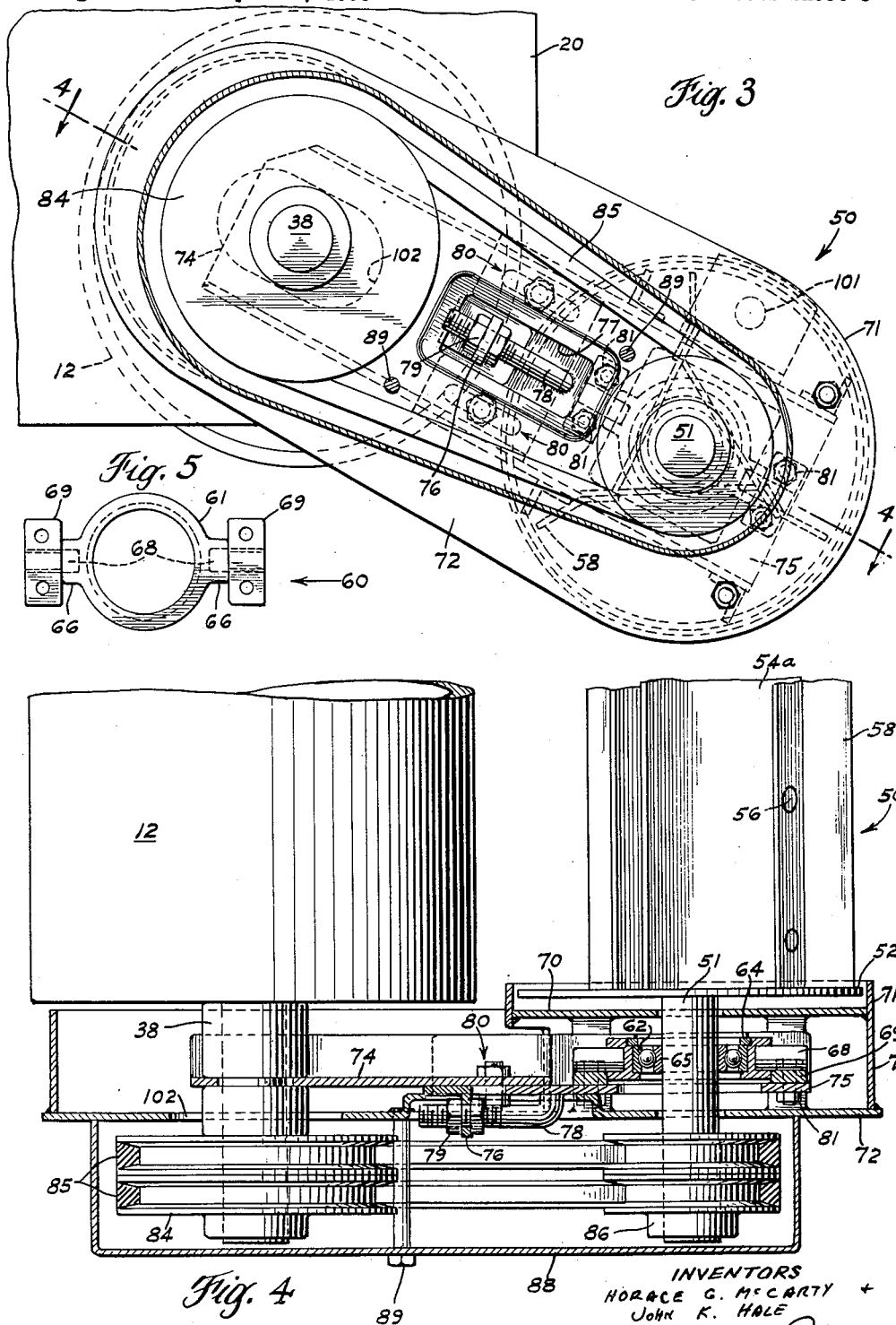

3,006,123
AGRICULTURAL IMPLEMENT
Horace G. McCarty and John K. Hale, New Holland, Pa., assignors to Sperry Rand Corporation, New Holland, Pa., a corporation of Delaware
Original application Sept. 10, 1956, Ser. No. 608,880, now Patent No. 2,906,076, dated Sept. 29, 1959. Divided and this application Sept. 9, 1959, Ser. No. 839,003
1 Claim. (Cl. 56—1)

This application is a division of our pending patent application Ser. No. 608,880, filed September 10, 1956, now Patent No. 2,906,076, issued September 29, 1959. The invention relates generally to agricultural machinery, and more particularly, to machines of the type used for treating hay by crushing or cracking the stems to accelerate drying of the hay when it is harvested.

Such a machine customarily employs cooperative, opposed crusher rolls between which mowed hay is delivered by a pick-up mechanism as the machine is drawn over a field. Heretofore, the conventional pick-up mechanism has comprised a reel having a plurality of resilient fingers or tines rotatable between stripper elements positioned intermediate the fingers, as shown, for example, in U.S. Patent No. 2,345,715, to R. H. Reed, issued April 4, 1944. Such a pick-up mechanism has a great number of parts and it is relatively costly to manufacture. Improved pick-up structures employing cam means or the like to control the extension of pick-up fingers are even more costly.

One object of this invention is to provide a hay crusher which is of greatly simplified construction over crushers of prior design.

Another object of this invention is to provide a hay crusher having stripperless pick-up means for elevating hay from the ground and delivering it rearwardly to cooperative crusher rolls.

Another object of this invention is to provide a stripperless pick-up mechanism which will elevate hay with equal ease from either a swath or windrow.

Another object of this invention is to provide a rotatable stripperless pick-up having means for shielding the opposite ends of the pick-up to thereby prevent material from wrapping around the bearings in which the pick-up is rotatably supported.

Another object of this invention is to provide a stripperless pick-up mechanism mounted so that it is free to follow the contour of the ground, being pivotally supported at its respective ends for pivotal movement about an axis transverse to the longitudinal axis of the mechanism.

A further object of this invention is to provide a hay crusher having a stripperless pick-up mechanism adapted for the selective reception of one of several different types of stripperless pick-up members, the various pick-up members being adapted for various types and conditions of crop material.

A still further object of this invention is to provide, in a device of the character described, a simplified drive mechanism.

A still further object of this invention is to provide a hay crusher which, due to its simplified construction, can be maintained in optimum operating condition at low cost.

Other objects of this invention will be apparent hereinafter from the specification and from the recital in the appended claim.

In the drawings:

FIG. 1 is a fragmentary perspective view of a hay crusher constructed according to one embodiment of this invention;

FIG. 2 is an enlarged, fragmentary side view of the crusher showing in particular the cooperative crusher rolls, the stripperless pick-up means and the drive means for the machine;

FIG. 3 is an enlarged fragmentary side elevation of the left side of the crusher looking from front to rear and showing the lower pick-up roll, and the pick-up reel, and illustrating the means for adjusting the reel relative to the roll;

FIG. 4 is a section taken on the line 4—4 of FIG. 3 and looking in the direction of the arrows;

FIG. 5 is a side elevation of one of the bearing housings used in mounting the respective ends of the stripperless pick-up reel;

FIG. 6 is a section taken through the pick-up reel on a plane transverse to the axis of the reel;

FIGS. 7 and 8 are sections similar to FIG. 6 and illustrating pick-up reels constructed according to other embodiments of this invention; and, FIG. 9 is a side elevation of a serrated, crop engageable strip which may be employed on the pick-up reel.

Referring now to the drawings by numerals of reference, 10 denotes generally a hay crusher constructed according to this invention. The crusher is adapted for ground traversing movement, toward the right of FIG. 1, to pick up crop material, crush and crack the stems between cooperative crusher rolls, and then discharge the material rearwardly and onto the ground. The front of the crusher is connectable to a tractor, not shown; or, when it is used in combination with a mower, the crusher is connectable to the rear end of the mower frame in a conventional manner.

Crusher 10 comprises a pair of cooperative, horizontal, parallel rolls, namely, upper roll 11 and lower roll 12, both of which are rotatably mounted on a frame 14, the upper roll being disposed relative to the lower roll as best shown in FIG. 2. The axes of the rolls are in a common plane which forms an acute angle with the ground on the material receiving side of the rolls. The axis of the upper roll is in a vertical plane spaced forwardly of all portions of the lower roll. The axis of the lower roll is in a horizontal plane spaced below all portions of the upper roll. Frame 14 includes a front cross pipe 15 having a forwardly projecting hitch member 16, shown fragmentarily in FIG. 1. At its rear end frame 14 is supported by a pair of relatively spaced caster wheels 18, one of which is shown.

Welded, bolted, or otherwise affixed to each side of frame 14 is a vertically extending plate 20. The plates on each side of the frame are connected adjacent their upper ends by a horizontal cross member 21. Member 21 is generally rectangular in cross section; and mounted medially on the member is a gear box 22 having a forwardly extending power input shaft 24 connectable through universal coupling 25 to a shaft from the P.T.O. of a tractor.

Extending outwardly from opposite sides of gear box 22 are drive shafts 26 and 28 supported at their outer ends in pedestal-bearing members 29. Members 29 likewise support downwardly and forwardly inclined side plates 30 which are pivoted for movement about a horizontal axis defined by drive shafts 26 and 28. The lower ends of plates 30 have bearings 31 in which stud shafts 32 on the ends of upper roll 11 are journaled. Plates 30—30 are connected by a cross brace 33 extending parallel to roll 11, but spaced radially from the periphery thereof.

The stud shaft 32 at the left hand end of the upper roll 11, looking at the crusher from the front, has an outwardly projecting portion 32a (FIG. 1) on which a sprocket 34 is keyed. Trained over sprocket 34 and over a sprocket 35 keyed on the outer end of drive shaft 26 is an endless chain 36, whose tightness is adapted to be regulated by tightener 36a. It will thus be seen that upper roll 11 is driven from the P.T.O. of the tractor through input shaft 24, gear box 22, drive shaft 26, sprocket 35, endless chain 36, and sprocket 34. When viewed as shown in FIG. 2, upper roll 11 rotates clockwise.

Vertical plates 20 have portions 20a which project below frame 14; and, journaled in these portions are stud shafts 38 of lower roller 12. The stud shaft at the right hand end of lower roll 12, again looking at the crusher from the front, has a sprocket 39 keyed to it (FIG. 2). Trained over sprocket 39 and a sprocket 40 (FIG. 1) keyed on the outer end of drive shaft 28 is an endless chain 41. Endless chain 41 is provided with tightening means (not shown) similar to tightening means 36a. When viewed as shown in FIG. 2, lower roll 12 rotates counter-clockwise, being driven from the tractor P.T.O. through imput shaft 24, gear box 22, drive shaft 28, sprocket 40, endless chain 41, and sprocket 39.

The clockwise and counter-clockwise rotation of the upper and lower rolls, respectively, causes crop material directed upwardly and against the rolls from the front, to be fed between the rolls and crushed. After the material has been crushed, it is passed to the rear of the rolls where it drops to the ground. Since the charges of material being fed between the rolls will vary, it is necessary that the upper roll 11 be movable away from lower roll 12 when a large charge of material is delivered. It is for this reason that the lower roll 12 is rotatable at a fixed position relative to frame 14, whereas upper roll 11, including the plates 30 on which it is mounted, are swingable relative to the frame about the axis of shafts 26—28.

Due to its mounting, upper roll 11 is constantly urged toward lower roll 12 by the force of gravity. However, in addition to gravity, roll 11 is biased downwardly by a pair of tension springs 42, one at each side of the crusher. Each spring is mounted as shown in FIGS. 1 and 2, having an upper end connected by bolt 44 to a bracket 45 welded to its associated plate 30, and a lower end hooked on a support arm 46 welded to its adjacent vertical plate 20. Thus, any upward, swinging movement of roll 11 is against the downward pull of springs 42.

Suitable, conventional scraper means may be provided for the respective crusher rolls to keep them free from material to thereby prevent fouling. In FIG. 1 a scraper member 48 is shown for upper roll 11.

Rotatable in front of crusher rolls 11 and 12 is a horizontal, stripperless pick-up 50. Pick-up 50 is adapted to elevate crop material from the ground and direct it towards the mouth formed by the rolls 11 and 12, wherein the rolls may grab onto the material and pull it between them to thereby crush the material and to deposit it rearwardly onto the ground.

Pick-up reel 50 comprises a pair of coaxial stud shafts or shaft sections 51, each having a disc 52 affixed to it. Extending between the discs and rigidly connected thereto, as by welding, are three triangularly arranged longitudinal bars (FIG. 6) 54a, 54b, and 54c. The bars have portions 55a, 55b, and 55c, respectively, to which are connected, as by bolts 56, crop material engaging strips 58. Strips 58 comprise elongated pieces of sheet metal or the like having longitudinal edges adapted for successive engagement with the material on the ground on rotation of the reel.

Each stud shaft 51 at the respective ends of reel 50 is supported in a mounting 60 (FIG. 5) for pivotal movement about an axis transverse to the axis of rotation of the pick-up. Mounting 60 comprises a cast bearing-support 61 which holds the outer race 62 of an anti-friction bearing. Outer race 62 is locked in the mounting by a snap ring 64 (FIG. 4). The inner race 65 of the bearing surrounds its associated stud shaft 51. On diametrically opposite sides of support 61 are radially projecting ears 66 which carry pivot pins 68. The outer ends of pins 68 are rotatable in a pair of journal members 69 welded to a washer-plate 70 through which the associated stud shaft 51 projects. Surrounding each mounting 60 is an annular housing 71 having an outside closure plate portion 72.

Within each housing 71 on each side of the machine is a pair of over-lapping channels 74 and 75 through which projects a stud shaft 38 and a stud shaft 51 of lower roll 21 and reel 50, respectively. Channel 74 carries an L-shaped member 76 movable in a slot 77 in channel 75. Channel 75 carries an L-shaped bolt 78 which extends through member 76, there being provided adjustment nuts 79 on opposite sides of the member.

In addition to the connection of channels 74 and 75 by means of bolt 78, member 76 and nuts 79, the channels are connected, above and below members 76, by nut-bolt-slot means indicated at 80 and clearly shown in FIG. 3.

Each channel 74 is fixed relative to its associated stud shaft 38 of lower roll 12. Each channel 75 is likewise fixed relative to the associated stud shaft 51 of pick-up 50 by nuts-bolts 81 which rigidly connect mounting 60 to channel 75. By loosening nut-bolt-slot means 80 and then adjusting channels 74 and 75 relative to each other by means of nuts 79, bolts 78, and member 76, the relative position of reel 50 and lower roll 12 can be regulated. After a desired adjustment has been obtained, nuts 79 are tightened up and then means 80 is rigidly secured to clamp the channels in place.

Reel 50 is driven from the lower roll 12. The stud shaft 38 at the left hand end of the lower roll (FIG. 1) has a double pulley 84 affixed to it (FIG. 4). A pair of endless belts 85—85 are trained over the double pulley and over a double pulley 86 keyed on the adjacent stud shaft 51 of the pick-up. The use of double pulleys provides the needed driving force for the pick-up reel in a minimum amount of space. Since pick-up 50 is adjustable toward or away from lower roll 12, by adjustment of channels 75 and 74 relative to each other, it will be apparent that this means will serve to control or regulate the tightness of endless belts 85.

Surrounding the pulley drive structure between lower roll 12 and reel 50 is a hood 88 fastened in place by elongated bolts 89 which extend through the outside wall of hood 88 and thread into the side portion 72 of housing 71.

Pick-up 50 is swingable, up and down, about the axis of lower roll 12. When in operative position, the reel assumes a position as shown in FIG. 1. When the the crusher is not in use or in transport, the reel may be swung upwardly towards frame 14 to get it out of the way. To set the position of the reel relative to the ground, adjustment means is provided comprising a cross pipe 90 (FIGS. 1 and 2) mounted on front end of frame 14. Pipe 90 has a fixed radial arm 91 pivotally connected at 92 to a link 94 connected to a suitable control mechanism, not shown. Each end of pipe 90 extends through a pillow block 95 on frame 14; and, each end of the pipe has a fixed radial crank arm 96 from which a link 98 depends. Each crank arm 96 is connected to its associated link 98 by means of a pin 99 carried on the arm and movable in a lost-motion slot 100 in the link.

The lower ends of depending links 98 at opposite sides of the machine are pivotally connected, as at 101, to the top of the housing 71. It will thus be apparent that by rocking pipe 90 by means of link 94 and arm 91, crank arms 96 at the opposite sides of the pipe will be raised or lowered, as the case may be, to thereby raise or lower pick-up 50 through its connection thereto through links 98. A slot 102 is provided in side plate 72 of housing 71 to provide the necessary clearance between the housing and stud shaft 38 so that the housing will not come into interference with the shaft when the pick-up is adjusted relative to the lower roll.

When in lowered position, the pick-up 50 is adapted to extend so that the cylinder generated by its rotating crop engaging members 58 is slightly spaced from the ground, denoted G (FIG. 2). For this purpose, a pair of ground engaging spring-runners 104 are provided for the pick-up, one adjacent each end thereof and connected to the adjacent housing 71.

In operation, the implement is towed across a field of material to be crushed. The material, which has been cut previously, is engaged by the rapidly rotating pick-up 50, elevated and directed upwardly and rearwardly towards the crusher rolls, particularly upper roll 11 mounted forwardly of the lower roll 12. Roll 11 rotating clockwise (FIG. 2) sweeps the material toward the mouth formed between it and lower roll 12; then the counter-rotating rolls pull the material between them, and crush it. Material is air borne from the time it leaves the pick-up until it engages the crusher rolls, the rearward movement of the material from the pick-up to the crusher rolls being produced in part by counter-clockwise rotation of the pick-up and the centrifugal forces developed, partly by the forward movement of the machine, and partly by the pull on the material exerted by the crusher rolls, particularly upper roll 11. The centrifugal force developed on rotation of pick-up 50 likewise keeps the material from wrapping around the pick-up in operation. No stripping structure whatsoever is provided.

As the crusher is traversed across a given field, various ground conditions will be encountered. High and low spots in the field will cause the pick-up 50 to pivot about its transverse axes provided by the pivot pins 68 at each end of the pick-up. For example, if the left hand end of the reel hits a high spot in the ground (looking at the reel from front to rear) the left end of the reel will lift up. Reel 50 will pivot about the transverse pivot pins 68 at the opposite or right hand end of the reel. After the high spot has been passed, the reel will drop back down to horizontal parallel position relative to the crusher rolls.

When pick-up 50 lifts up at one end or the other, no movement is imparted to cross pipe 90 since the link 98 at the raised end of the pick-up merely moves vertically relative to its arm 96, the pin 99 on the arm sliding in lost-motion slot 100.

It will be noted from FIG. 4 that the bearings for pick-up 50 and the pulley drive mechanism between lower roll 12 and the pick-up are entirely enclosed. Further, the end discs 52 of the pick-up are guarded by overlapping portions 71a of housing 71. As a result, material is prevented from getting into the bearings for the pick-up, from fouling the pulley drive mechanism and also from wrapping around the opposite ends of the pick-up.

The pick-up structure just described is vastly more simple than pick-up means heretofore provided in crushers. Due to the relatively small number of parts, the pick-up may be manufactured at low cost and maintenance cost is low. More important, since no stripper mechanism is provided, the crusher may be operated at great speed. The pick-up has a great capacity for feeding material to the crusher rolls. Ground speeds in excess of ten miles an hour are easily obtainable with a crusher provided with such a pick-up. In crushers having conventional pick-ups provided with strippers, such high speed operation is impossible.

Referring now to FIG. 7 there is shown in cross section a pick-up reel constructed according to another embodiment of this invention. Two angle plates, 105 and 106, respectively, are disposed between discs 52, being welded at their ends to the discs. Each plate has an edge, 105a and 106a, respectively, to which is connected a crop engaging strip 108. Strips 108 are connected to their respective plates by bolts 109. The use of two crop engaging strips instead of three (FIG. 6) is desirable when certain types of material are being harvested, usually heavy material.

In FIG. 8, there is shown still another embodiment of the invention, illustrating a pick-up structure similar to that shown in FIG. 6, but having leather straps 110 provided in place of the metal strips 58. The leather straps provide a certain amount of flexibility which is desired at times.

When a more aggressive feeding action is desired, the strip 58, as shown in FIG. 6, may be provided with serrated edges 112, as shown in FIG. 9. Such serrations are particularly desirable when the crop material being handled is particularly light, such as very short stemmed alfalfa.

In the drawings, the use of a pick-up reel having two or three crop engaging transverse members has been shown. However, any desired number may be employed to adapt the pick-up for various conditions and types of crops.

While the pick-up of this invention has been described in connection with a crusher, it is to be understood that the pick-up may be used on other implements. Further, it will be evident that the pick-up is capable of further modification, structure-wise. This application is intended to cover any variations, uses, or adaptations of the invention following, in general, the principles of the invention and including such departures from the present disclosure as come within known or customary practice in the art to which the invention pertains, and as fall within the scope of the invention or the limits of the appended claim.

Having thus described our invention, what we claim is:

A machine for conditioning previously cut crop material to facilitate drying comprising a mobile frame adapted to travel forwardly, a pair of cooperative treating rolls horizontally mounted on said frame one above the other and extending transverse to the direction of travel of the frame, the axes of said rolls being in a common plane which forms an acute angle with the ground on the material receiving side of the rolls, the axis of said one roll being in a vertical plane spaced forwardly of all portions of said other roll, and the axis of said other roll being in a horizontal plane spaced below all portions of said one roll.

References Cited in the file of this patent

UNITED STATES PATENTS

| | | |
|---|---|---|
| 2,711,622 | Cunningham | June 28, 1955 |
| 2,712,282 | Koch | July 5, 1955 |